Aug. 18, 1925.
P. WRIGHT
MACHINE FOR STRAIGHTENING, CUTTING, AND HEADING BALE TIES
Filed July 12, 1924 7 Sheets-Sheet 3
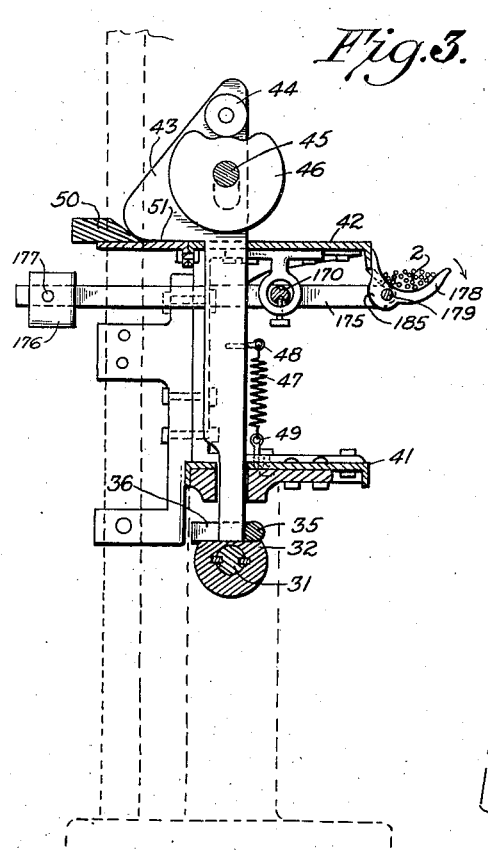
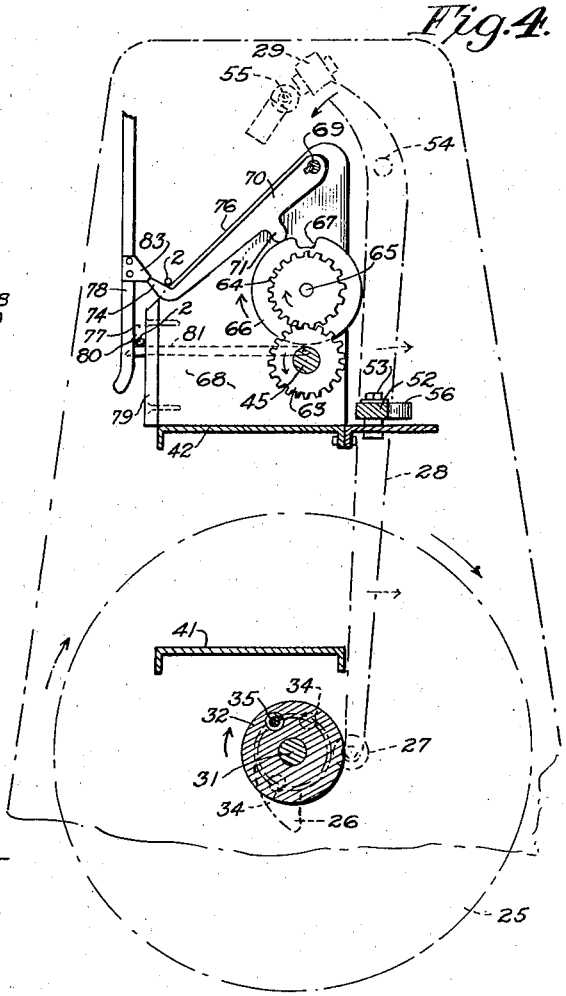
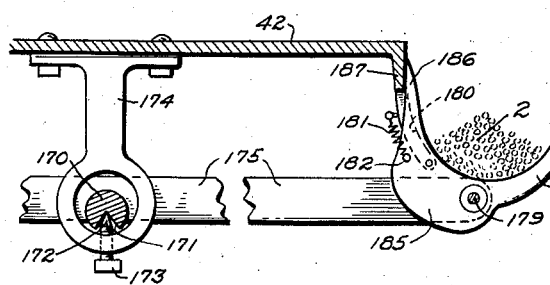
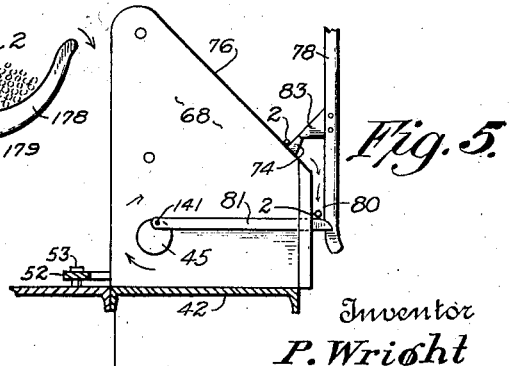

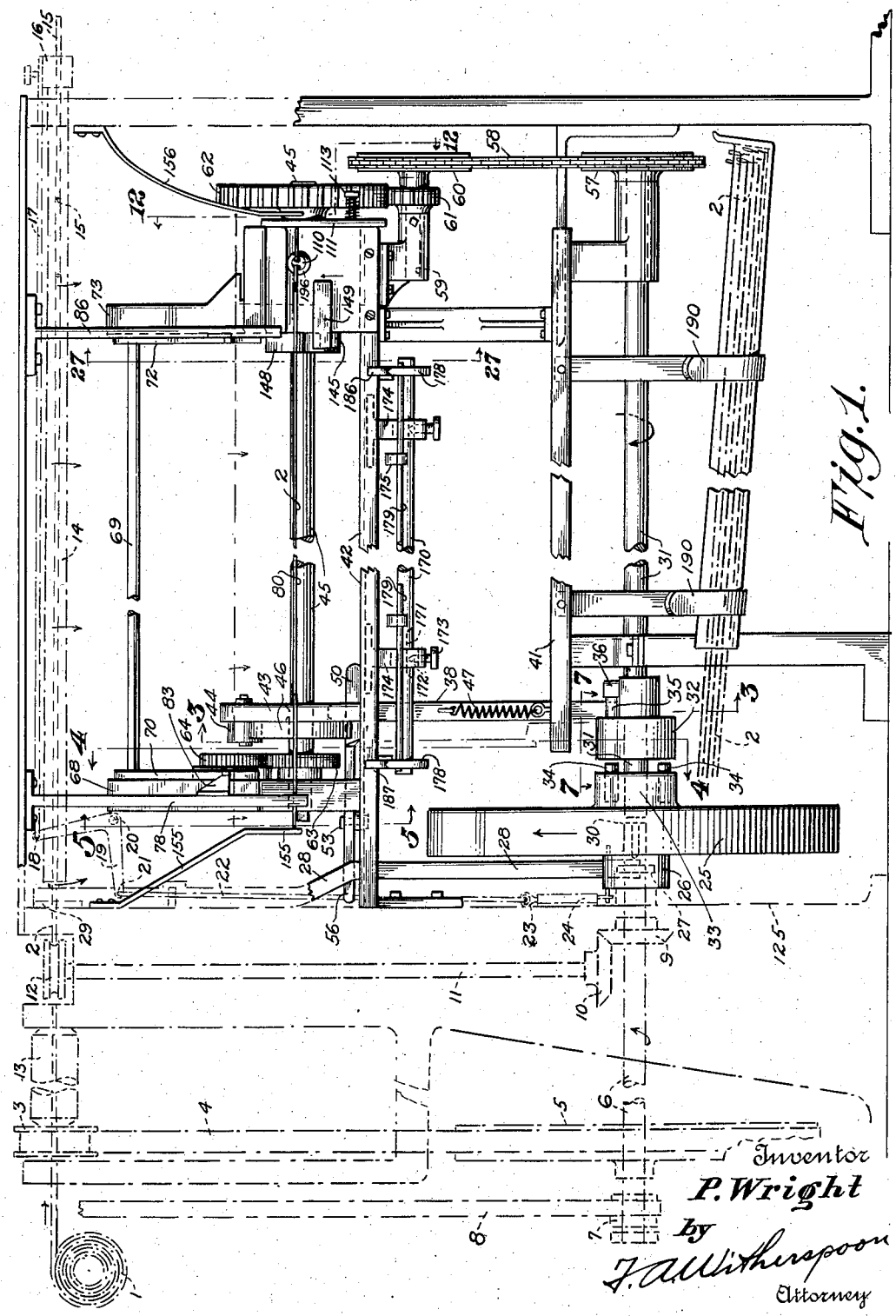

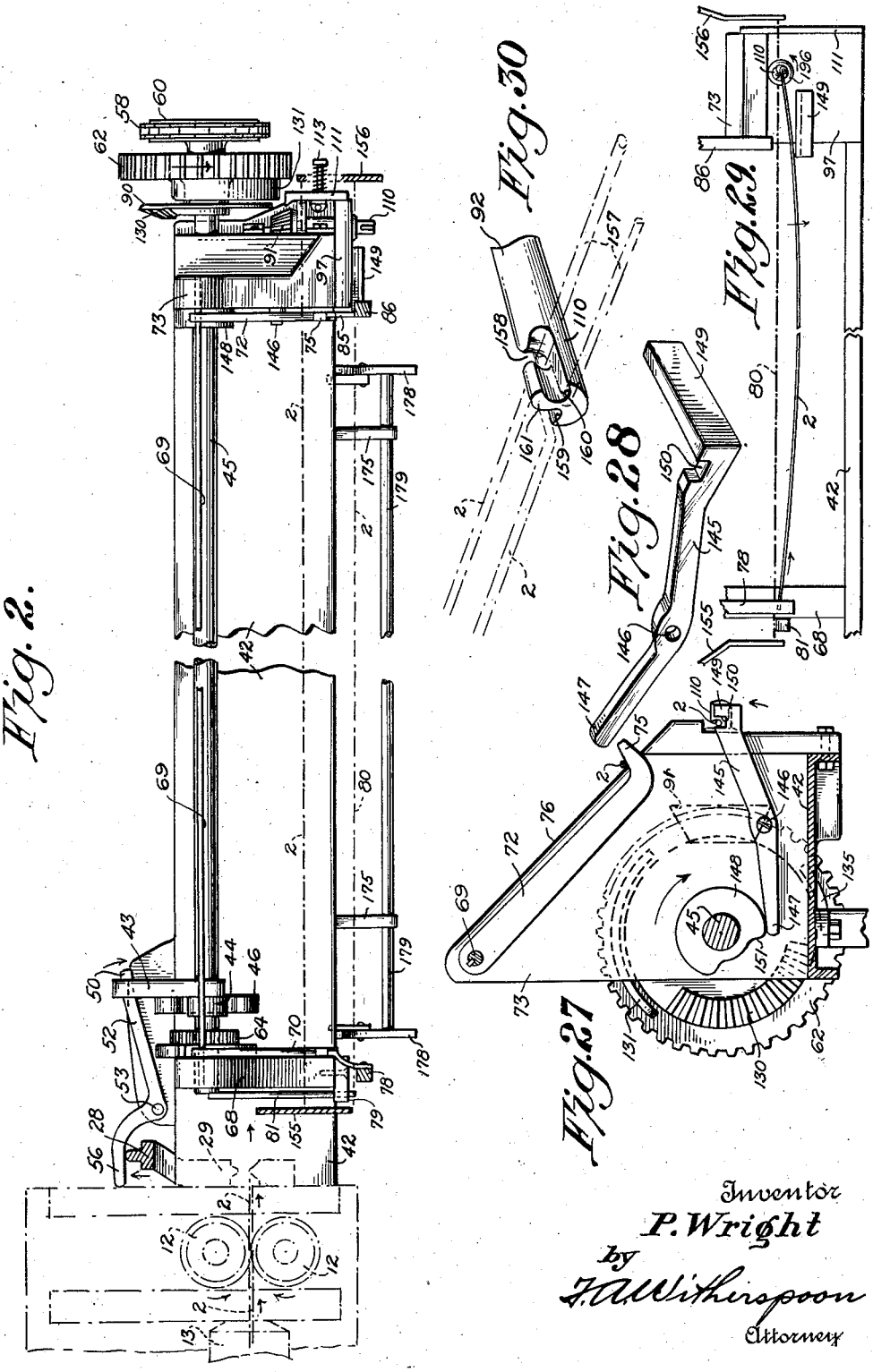

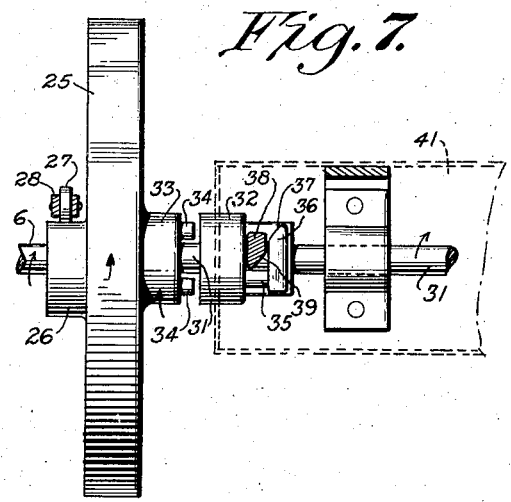
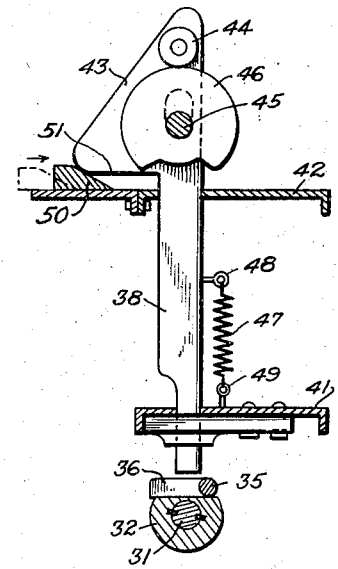
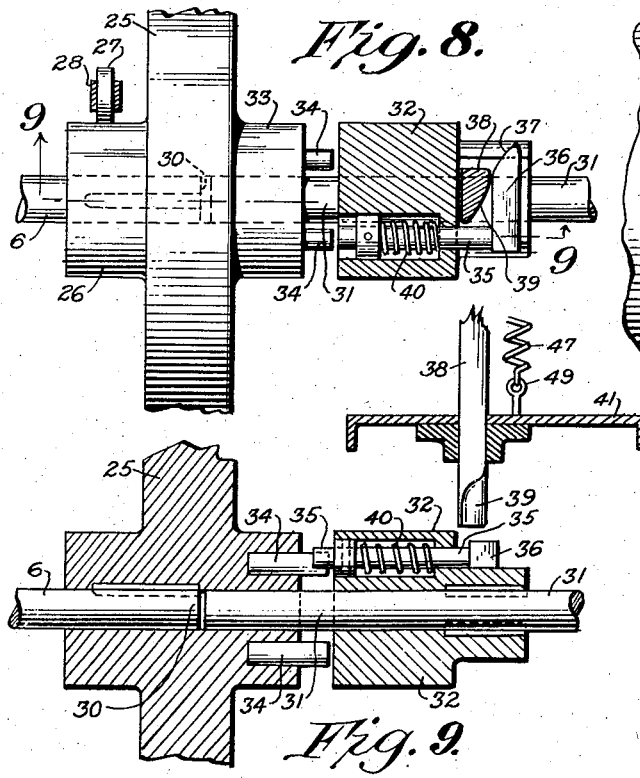
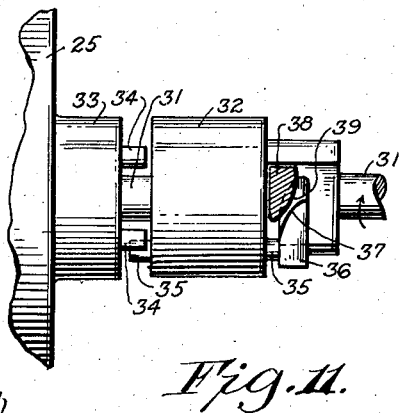

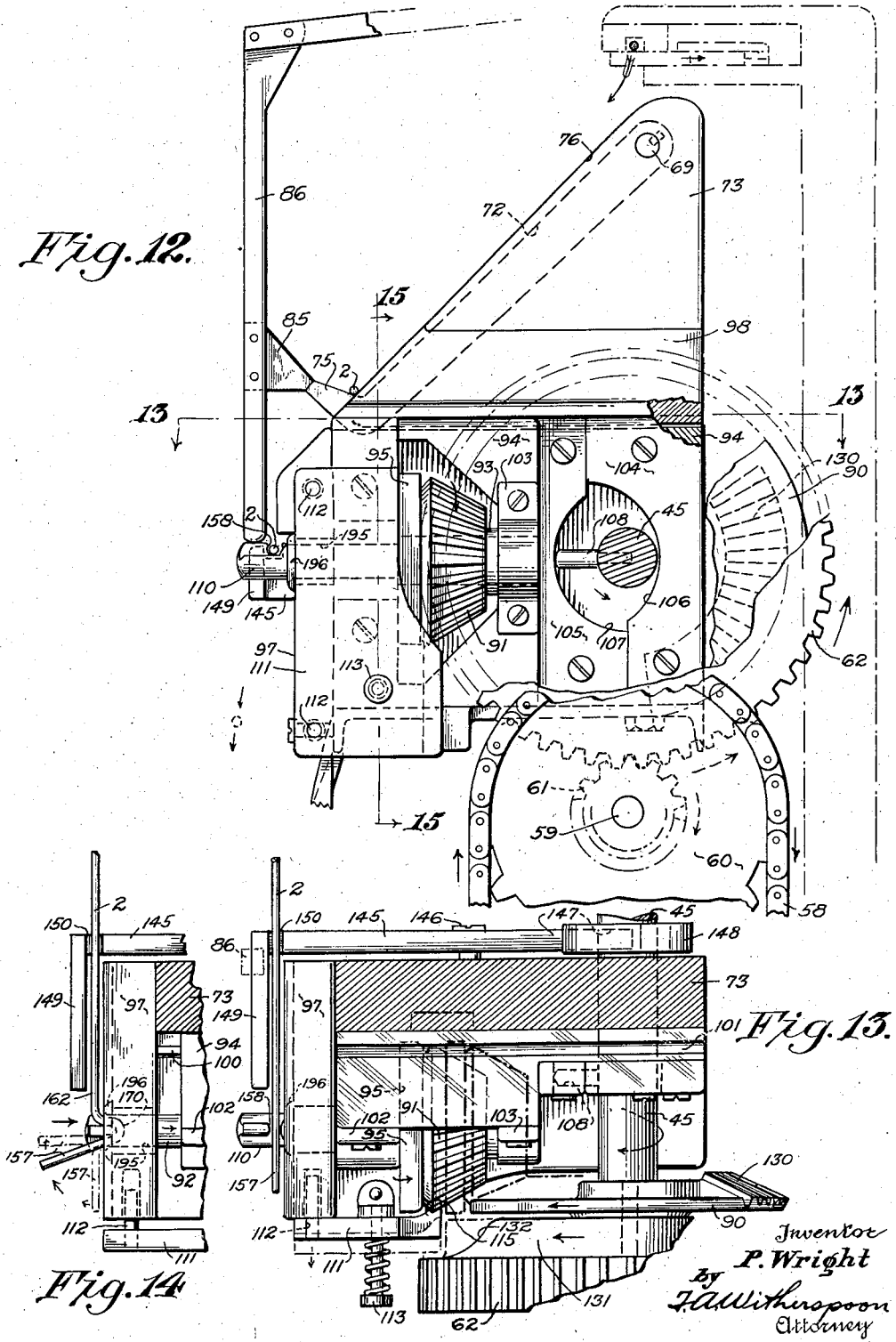

Aug. 18, 1925.

P. WRIGHT 1,550,603

MACHINE FOR STRAIGHTENING, CUTTING, AND HEADING BALE TIES

Filed July 12, 1924 — 7 Sheets-Sheet 6

Inventor
P. Wright
by
F. A. Witherspoon
Attorney

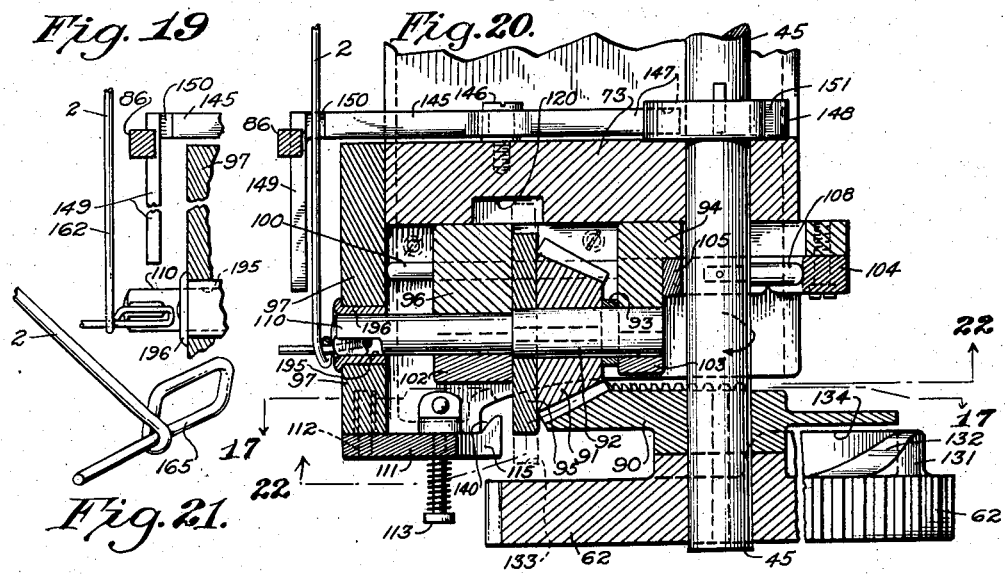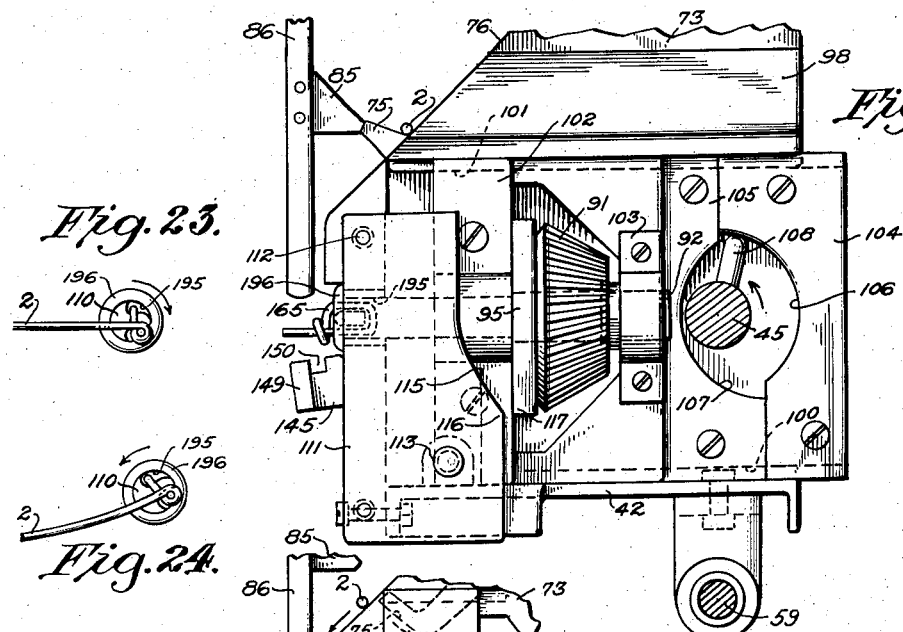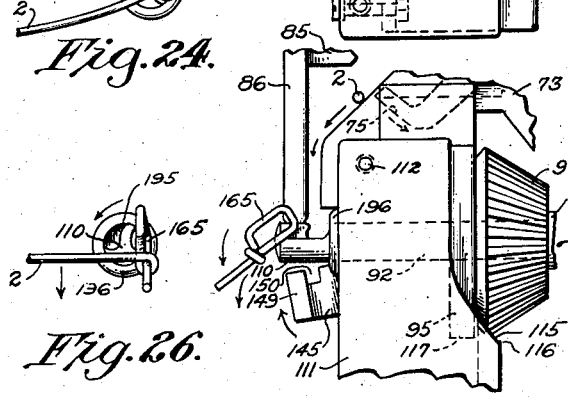

Patented Aug. 18, 1925.

1,550,603

UNITED STATES PATENT OFFICE.

PARVIN WRIGHT, OF CHICAGO, ILLINOIS, ASSIGNOR TO GERRARD WIRE TYING MACHINES COMPANY, INC., OF CHICAGO, ILLINOIS, A CORPORATON OF NEW YORK.

MACHINE FOR STRAIGHTENING, CUTTING, AND HEADING BALE TIES.

Application filed July 12, 1924. Serial No. 725,654.

*To all whom it may concern:*

Be it known that I, PARVIN WRIGHT, a citizen of the United States, residing at Chicago, in the county of Cook and State of Illinois, have invented certain new and useful Improvements in Machines for Straightening, Cutting, and Heading Bale Ties; and I do hereby declare the following to be a full, clear, and exact description of the invention, such as will enable others skilled in the art to which it appertains to make and use the same.

This invention relates to a machine for straightening, cutting and heading bale ties, and has for its object to improve the constructions heretofore proposed.

With these and other objects in view, the invention consists in the novel parts and combinations of parts more fully hereinafter disclosed and particularly pointed out in the claims. Referring to the accompanying drawings forming a part of this specification in which like numerals designate like parts in all the views:—

Figure 1 is a front elevational view partially broken away of an apparatus made in accordance with this invention;

Figure 2 is a plan view of the parts shown in Fig. 1;

Figure 3 is a sectional view taken on the line 3—3 of Fig. 1, looking in the direction of the arrows;

Figure 4 is a sectional view taken on the line 4—4, Fig. 1, looking in the direction of the arrows;

Figure 5 is a detailed sectional view taken on the line 5—5 of Fig. 1, looking in the direction of the arrows;

Figure 6 is a detailed sectional view of the weighing apparatus with which the machine is provided;

Figure 7 is a plan view partially in section taken on the line 7—7 of Fig. 1, looking in the direction of the arrows;

Figure 8 is a view similar to Fig. 7 but showing certain of the parts in greater detail;

Figure 9 is a sectional view taken on the line 9—9, Fig. 8, looking in the direction of the arrows;

Figure 10 is a detail view illustrating the control mechanism of the machine;

Figure 11 is a view similar to Fig. 7, but showing the parts in different positions;

Figure 12 is a sectional view taken on the line 12—12, Fig. 1, looking in the direction of the arrows;

Figure 13 is a sectional view taken on the line 13—13, Fig. 12, looking in the direction of the arrows;

Figure 14 is a detail view showing a position of the parts different from that illustrated in Fig. 13;

Figure 19 is a sectional plan view of the operative end of the knotter;

Figure 20 is a sectional view of the knotting mechanism;

Figure 21 is a perspective view of the knotted end of the tie wire;

Figure 22 is a side elevational view partly in section taken on the line 22—22 of Fig. 20, looking in the direction of the arrows;

Figure 23 is a detail view illustrating the finished knot just before it leaves the knotter;

Figure 24 is a view similar to Fig. 23, showing the tie wire about to be released from the knotter;

Figure 25 is a view illustrating the position of the parts as the tie wire is leaving the knotter;

Figure 26 illustrates the position of the tie wire immediately after leaving the knotter head;

Figures 15, 16:
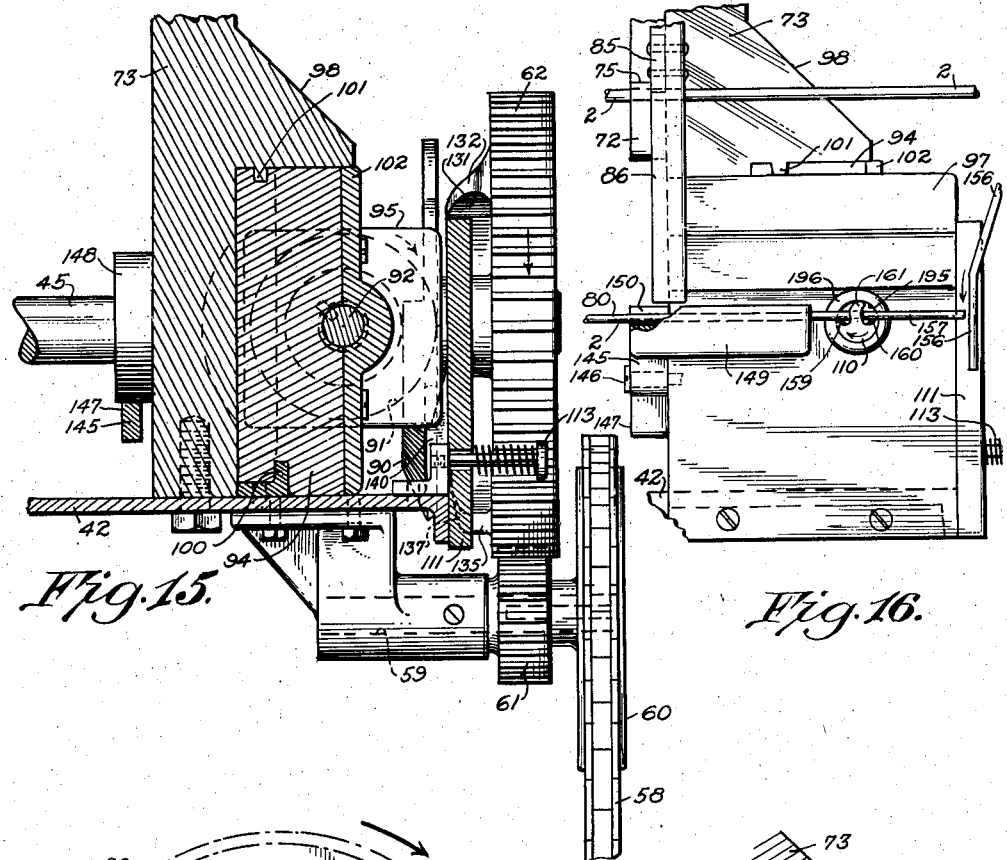
Figure 15 is a sectional view taken on the line 15—15, Fig. 12, looking in the direction of the arrows.
Figure 16 is a front elevational view of the knotting mechanism.
Figures 17, 18:
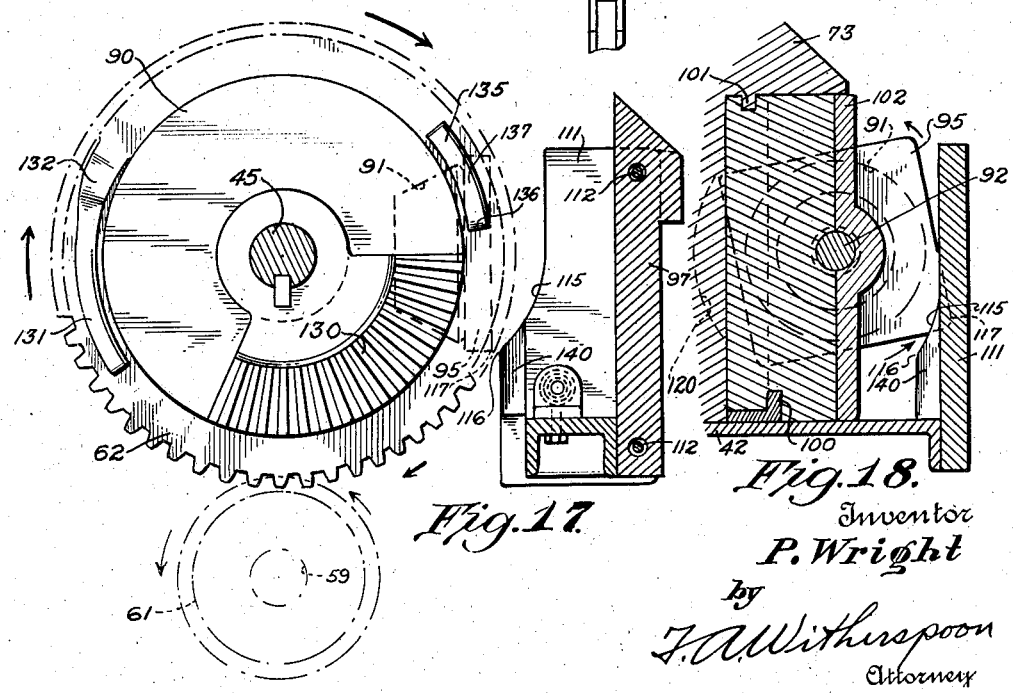
Figure 17 is a sectional view taken on the line 17—17, of Fig. 20, looking in the direction of the arrows.
Figure 18 is a detail sectional view similar to Fig. 15, showing the parts in a different position.

Figure 27, Sheet 2, is a sectional view taken on the line 27—27, Fig. 1, looking in the direction of the arrows;

Figure 28 is a perspective view of one of the parts shown in Figure 27;

Figure 29 is a diagrammatic view illustrating the position of one of the tie wires as it is about to leave the knotter; and Figure 30 is a perspective view illustrating the relation of the knotter head with the tie wires during the heading operation.

In order that the invention may be the better understood, it is said:—It is well known there are at the present time in common use, machines which will straighten wire from coils of the same and cut it off after being straightened in predetermined lengths. One such machine is disclosed in U. S. Patent #1,466,334, dated August 28, 1923, entitled Machine for cutting and swaging bale ties, and issued to A. J. Gerrard, et al. This invention proposes to utilize to some extent the mechanism of the above-mentioned patented machine and to add thereto the other parts which are especially adapted for heading the tie wires after they have been straightened and cut. The principal parts of the above mentioned machine which are utilized in the present invention are diagrammatically illustrated in dotted lines on the drawings while the parts that are added to such machine appear in full lines.

It is not deemed necessary to go into the operation of said patented machine in detail, and therefore the following description will treat the prior construction in a general way and will be more detailed when it describes the construction of this improvement.

Referring more particularly to Figs. 1 and 2 of the drawings, 1 indicates the coil of wire, 2 indicates the straightened wire, 3 indicates a pulley operated from a belt 4 passing around the power pulley 5 mounted on the power shaft 6, provided with the power pulley 7, around which passes the power belt 8, and 9 indicates a bevel gear on the power shaft 6 meshing with the bevel gear 10 rigid with the shaft 11, carrying the grooved guide pulley 12, while 13 indicates a well known form of wire straightening device. All of the foregoing parts are or may be the same as in the above-mentioned prior patent. In said prior patent, however, the wire 2 passes along the guide member 14 until it strikes an adjustable obstruction indicated at 15, and which is more plainly shown at 43 in Fig. 1 of said prior patent. This said obstruction 15 is connected with the member 16 which is provided with the actuating rod 17 connected as at 18 to the bell crank lever 19 pivoted as at 20, and connected as at 21 to the rod 22, connected as at 23 to the clutch controlling device 24, which cuts in and cuts out the power from shaft 6 to the cam member 26 which actuates the roller 27 mounted on the cutting bar 28 carrying the cutter indicated at 29, Fig. 1. 25 indicates a fly wheel mounted on the shaft 6 and 125 indicates the framework, all as will be clear from said prior patent.

The power shaft 6 terminates at the point 30, Fig. 1, and in line with said shaft is another power shaft 31 provided with the collar 32 rigid with said shaft 31, as best shown in Figs. 1, 7, 8, 9, 10 and 11. Said fly wheel 25 is provided with a hub 33 carrying the pins 34 and said collar 32 is provided with a slidable pin 35 having a right angular extension 36 provided with a beveled end 37 all as will be clear from Figs. 7, 8 and 9. Coacting with the surface 37 is the vertically disposed member 38 provided at its lower end with a similar beveled surface 39 adapted to wedge in between the extension 36 and the collar 32, and to thereby slide the pin 35 longitudinally of the shaft 31. Said pin 35 is controlled by the coiled spring 40, see Figs. 8 and 9, and in its normal position the extreme end of pin 35 lies in the path of the pins 34, so that power will normally be transmitted from the shaft 6, to the fly wheel 25, to the pins 34, to the pin 35 to the collar 32, and to the shaft 31.

As best shown in Fig. 10, the vertically disposed member 38 passes up through the member 41 of the frame and also through the member 42 of the frame and is provided with the enlarged head 43, as shown. The extreme upper end of the head 43 is provided with a roller 44, and through said head also passes the shaft 45 on which is mounted the cam 46, as shown. A spring 47 attached to the member 38 as at 48 and to the frame 41 as at 49, controls in one direction, the movement of the member 38. As best shown in Figs. 2, 3 and 10, a wedge member 50 is adapted to reciprocate underneath the edge 51 of the extension 43, and thus raise the member 38 against the action of the spring 47 while said spring moves said member 38 in a downward direction after the wedge 50 has receded. The wedge 50 is carried by the extreme end of the lever 52 pivoted, as at 53, and actuated by the above mentioned cutting lever 28, all as will be clear from Figs. 1, 2, 3, 4 and 10.

It thus results from the mechanism thus far disclosed that as the wire 2 is pushed along the guide 14 and actuates the member 15 to push longitudinally the rod 17, the bell crank 19 is actuated to vertically lift the rod 32 and to operate the clutch with which the cam 26 is associated and thus cause the power from shaft 6 to rotate said cam 26, all as is disclosed in said Patent #1,466,334, above mentioned. The rotation of the cam 26, see Figs. 1, 2 and 4, actuates the lower end of the cutting lever 28 which is pivoted as at 54 and serves to cut off the wire 2, at the point 55, see Fig. 4. The actuation of said lever 28 causes it to contact with the end 56 of the lever 52 and to turn said lever on its pivot 53, Fig. 2, which forces the wedge shaped end 50 underneath the edge 51 of the extension head 43 and thus lifts the lower end 39 of the bar 38 against the action of the spring 47, all as will be clear from the drawings. The lifting of the lower end 39 of the bar 38 disengages said end from the extension 36 of the pin 35, and thus does the spring 40, Fig. 8, move said pin 35 in the path of the pins 34 and causes the collar 32 to transmit power from the shaft 6 to the shaft 31, each time a given length of wire is cut off at the point 55, Fig. 4.

On the extreme right hand end of the shaft 31, Fig. 1, is rigidly mounted a sprocket 57 around which passes a sprocket chain 58, and on the short shaft 59 is rigidly mounted a sprocket 60 around which said chain 58 also passes. Rigid with the sprocket 60 is the gear 61 meshing with the gear 62 mounted on the shaft 45 and serving to turn said shaft, all as will be clear from Fig. 1 of the drawings. Mounted on the left hand end of the shaft 45 is a gear 63 meshing with the gear 64 mounted on the stud shaft 65, Fig. 4. Rigid with the gear 64 is the disc or cam shaped member 66 having the depression 67 in its periphery. Said stud shaft 65 is carried by the frame member 68 of the frame and on said member 68 is mounted the shaft 69 carrying the lever 70 rigid therewith and provided with the projection 71 adapted to ride on the periphery of the disc 66, and to fall into the notch 67 at each revolution of said disc. Said lever 70 is also provided at its extreme lower end with the hook member 74. Referring more particularly to Figs. 1 and 27, it will be observed that on the right hand end of the shaft 69, as seen in Fig. 1, there is another lever 72 associated with another vertical member 73 forming a part of the frame of the machine. Said other lever 72 is also provided with a hook-like projection 75, as shown.

From the foregoing description, it will now be clear that as the power from the shaft 31 is transmitted through the sprockets 57 and 60, through the gears 61 and 62, through the shaft 45 and the gears 63 and 64, the disc 66 will be rotated, and the projection 71 will fall into the notch 67, thus moving the hook-like projection 74 carried by the lever 70 in a counter clockwise direction, as seen in Fig. 4. As said lever is rigid with the shaft 69, the turning of the same will likewise turn the companion lever 72, see Fig. 2, and its hooked end 75 in a clockwise direction. The parts are so timed that when a wire 2 is cut at the point 55, it will roll down the edges 76 of the end frame members 68 and 73, until it strikes the hook projections 74 and 75 carried by the levers 70 and 72, respectively, whereupon immediately another wire is fed out of the straightening machine at the point 55. While this said second wire is being fed out of the machine, the first-mentioned wire is held in the position shown in Fig. 4, but just before said second wire is cut at point 55, the projection 71 falls into the notch 67 and said wire 2 is allowed to fall into a space 77 located between the fender or member 78 of the frame and the member 79 thereof. Said wire 2 then occupies the position indicated at 80, Figs. 4 and 29.

In the meantime the continued rotation of the disc 66 forces the projection 71 out of the notch 67 and restores the levers 70 and 72 back to the positions shown in Figs. 4 and 27, respectively. When the levers return to the e last-named positions, the second wire falls down the edges 76 of the frame members 68 and 73, and occupies the position on the hooked ends 74 and 75 of the levers 70 and 72, indicated in Fig. 4. The frame or fender member 78, Fig. 4, is provided with a bracket or projection 83 against which the hook 74 of the lever 70 contacts and thus prevents the said hook 74 from moving too far, and it further closes up any space through which any succeeding wire might fall, before the period at which it is wanted in said space 77. Likewise, as best shown in Figs. 20 and 22, the hook 75 of the lever 72 is associated with a similar lug or bracket 85 mounted on the fender member 86 located at the right hand end of the machine, as seen in Fig. 1.

The wire 2 having gotten to the position 80 shown in Fig. 4, it comes opposite the heading member 110 which will now be described.

The heading or knotting mechanism is constructed and operated as follows:—

Referring first to Fig. 20, Sheet 7, there is rigidly mounted on the shaft 45, the segmental beveled gear 90 meshing with the bevel pinion or gear 91 rigid on the knotting shaft or member 92. On the right hand end of the knotting member 92, as seen in Fig. 20, there is rigidly attached the collar 93 and beyond said collar the slidable member 94 is disposed. The knotter shaft 92 rotates in said slidable member 94, as will presently appear. Said collar 93 contacts with the smaller end surface of the bevel pinion or gear 91 and rigid with the said gear 91 is the rectangular block 95. To the left of said block 95, as seen in Fig. 20, is another portion 96 of the slidable member 94. 97 indicates a portion of the frame constituting a housing for the parts just mentioned. As best shown in Fig. 15, the end frame member 73 of the machine is beveled as at 98 and is also thickened as indicated. This thickened portion 98 is cut away as shown to accommodate the sliding block 94 which slides upon the rails 100 and 101. A strap 102 (see Figs. 13, 14, 15, 18, and 22) serves to hold the left hand portion of the knotter 92 in position to rotate in the said slidable block 94. A similar strap 103 holds the extreme right hand end of the knotter 92 in position as indicated in Fig. 22. Attached to the slidable block 94, as best shown in Figs. 12 and 20, are facing plates 104 and 105 made of hardened steel. The facing plate 104 is cut away to form the circular surface 106 and the facing plate 105 is cut away to form a similar surface 107 as indicated in Fig. 22. The said surfaces 106 and 107 are not struck from the same centers as will be clear from Fig. 12, so that the pin 108 carried by the shaft 45, as it contacts with said surfaces reciprocates the block 94 to the right and left as seen in Figs. 20 and 22.

It will be clear from the mechanism thus far described that as the pin 108 makes a complete revolution the knotting member 92 with its associated parts will reciprocate toward the right and left, as seen in Figs. 20 and 22, and the bevel gear pinion 91 will be intermittently disengaged from the segmental bevel gear 90 and re-engaged therewith for a purpose to be presently described. That is to say, the parts will be reciprocated from the position shown in Fig. 20 to the position shown in Figs. 12 and 13, whereupon the extreme end portion 110 of the knotter will project out beyond the frame portion 97 as indicated in said Fig. 12, while the segmental gear 90 will have moved its gear teeth through an angle of about 180° from the position shown in Fig. 20. When moving to its extreme left hand position, shown in Fig. 12, the teeth of the pinion 91 of course are disengaged from the teeth of the segmental gear 90 as above stated, and when they are to be re-engaged, there is some danger of the two sets of teeth not inter-meshing properly unless said danger is avoided.

To insure the proper engagement of these two sets of teeth, there is provided the above-mentioned rectangular plate 95, which is rigidly attached to the knotter member 92 and rotates therewith. That is to say, said plate 95 being rigid with the pinion 91, the pin 108 after traveling through an arc of 90° in the direction of the arrow, Fig. 12, begins to move said pinion 91 and plate 95 from the position shown in Fig. 12, toward the right as seen in said figure. At the same time, the segmental gear 90 will turn in a counter-clockwise direction as seen in Fig. 12, and the teeth 130 of said gear 90 will therefore approach the teeth of said pinion 91 as will be readily understood. Therefore, to insure said proper re-engagement of said teeth, as above mentioned, the gear 62 is provided with a cam 131, Fig. 20, which has an inclined surface 132 which takes under the edge 133 of the plate 95, see dotted lines in Fig. 20. The parts are so proportioned that the engagement of the surface 132 with the edge 133 has the effect of rotating the plate 95 and pinion 91 to such positions as will insure the engagement of the teeth of the pinion 91 and of the segmental gear 90, all as will be readily understood.

From what has been so far disclosed, it will now be clear that as the clutch consisting of the members 32 and 34, Fig. 1, is operated, the gear 62 will turn the shaft 45 and the latter will turn the segmental gear 92 intermittently in the direction of the arrows shown. The parts are so timed that the segmental gear 90 will turn the pinion 91 and its associated parts through an angle of one and one quarter turns or about 450°. During this turning of the knotter shaft 92 through said angle, certain operations to be described below, will be performed on the wire 2 and more or less tension or spring action will be generated in said wire. In the meantime, the pin 108 will begin to move the knotter shaft 92 and its associated parts toward the left, as seen in Fig. 20, and thus to separate the teeth of the gear 90 from the teeth of the pinion 91. After this separation takes place, the knotter shaft 92 together with pinion 91 and their associated parts will be turned backward through an arc of 90° or through one quarter turn by reason of the plate 95 taking against the curved surface 115, all as will be presently referred to. The pin 108 will next move the parts back toward the right as seen in Fig. 12, and as the parts associated with the pinion 91 have been turned through an angle of one and a quarter turns, and have been turned by the plate 95 in an opposite direction through at least a quarter of a turn, the said pinion teeth and its associated parts are liable to have been moved out of their proper angular position due to the spring action that has been generated in the wire 2 above referred to. Therefore, to insure that the teeth of pinion 91 will be brought into their proper angular position to engage with the teeth of the segment 90, the cam 131 having the surface 132 will act to contact with the edge 133 of the plate 95, and thus positively turn said plate and pinion 91 into the proper angular position to insure the engagement of the teeth of said pinion with the teeth of the segment 90. The dwell 134 associated with the cam 131 still further serves to positively hold the teeth of the pinion 91 in the proper desired angular position.

On the other hand, the said spring action that has been generated in the wire 2 may turn the plate 95 and the teeth of the pinion 91 in a direction opposite to that in which the cam 132 would act to counteract said turning. In such case, the cam 135 and its associated parts 136 and 137, see Figs. 15 and 19, will come into action and turn the teeth of the pinion 91 through contact with the plate 95 into the proper position to insure that they will re-engage with the teeth of the cam 90. That is, said cam 135 is so positioned on the gear 62 that its advancing shoulder 136 will come into the plane of the plate 95, see dotted lines, Fig.

17, and the top or flat portion 137 of the said cam will take against one of the flat sides of the plate 95 and so hold the said plate from further revolution about the member 92 as a center. The cam 135 is sufficient in length to hold the said plate 95 in the correct position until pin 108 in its continued movement takes against its bearing plate 105 and starts the movement of the member 92 and its associated parts towards the left, as seen in Fig. 22.

The pinion 91 and plate 95 are turned back through the above mentioned angle of 90° as follows:—As best illustrated in Figs. 12 and 20, there is loosely attached to the frame member 97 the toe plate member 111 as by the bolt and pin connections 112. A spring controlled member 113, see Figs. 13 and 20, controls the position of said plate relative to its pivot 112. It will be further observed from the said figures, that said plate 111 is provided with the inclined or beveled portion 115, see Fig. 22, which starts at the point 116 and which is opposite the lower edge 117 of the plate 95.

As the pin 108 shoves the plate 95 toward the left, as seen in Fig. 22, said corner 117 strikes the portion 116 of the incline 115 and rides up along the curve or incline 115, as will be clear from Fig. 20, whereupon the pressure on the plate 95 exerted by the incline 115 will rotate said plate 95 around the axis of the knotter member 92 as the center. This rotation will extend through an arc of one quarter turn or of 90°, while the plate 95 is moving toward the left, as seen in Figs. 20 and 22. In order to permit the plate 95 to rotate through this said arc and in the manner described, the frame member 73 is cut away as at 120, see Figs. 18 and 20.

The pin 108 in its continued revolution, see Fig. 12, will take against the projecting corner of the plate 104 and move the same together with the knotter member or shaft 92 and its associated parts to the right as seen in said figure. In so doing, see Figs. 15, 18 and 22, the lower corner 117 of the square plate 95 will strike the beveled portion 140 of the plate 111. However, the plate 111 will give against the compression of the spring of the member 113 and thus allow the plate 95 to snap past the said plate 111. During this operation, the plate 95 may, however, become canted, or the said plate 95 and the pinion 91 rigid therewith may move out of the proper engaging position with the segmental gear 90 due to the spring action of the said wire 2 above mentioned, but as previously described, the cam 131 carried by the gear 62 will come into position at the proper time and right the plate 95 so that the pinion 91 will be positively positioned to mesh with the teeth 130 of the segmental gear, as disclosed above.

It will now be clear that the parts of the mechanism are so positioned and timed that when a wire 2, Fig. 1, has been released from the hooks 74 and 75, see Figs. 4 and 12, and is dropping down into the space 77, another wire 2 has been fed from the straightening mechanism through the point 55, and cut off by the cutting member, and has dropped onto the inclined surfaces 76 of the frame members 68 and 73 of the machine. But the hooks 74 and 75 after releasing the wire 2 held thereby are repositioned against the brackets 83 and 85 before the newly cut wire 2 has fallen down the inclines 76 to said hook members 74 and 75. The wire 2 thus released from the hooks falls down through the space 77, into the position shown at 80, and one end of the said wire rests on the holding arm 81, see Figs. 4 and 5. This holding arm 81 is pivoted eccentrically at 141 to one end of the shaft 45. The other end of arm 81 projects through the plate 79, see Figs. 2, 4 and 5, so as to support the wire 2.

The other end of the wire 2 is supported by an L-shaped member 145, Figs. 27 and 28, Sheet 2, pivoted as at 146 to the supporting plate or frame member 73. One end 147 of this member 145 is engaged by a cam 148 mounted upon the shaft 45, as clearly shown in said Figs. 27 and 28. The other end of the member 145 is provided with the right angled extension 149 and the notch 150 adjacent thereto, and adapted to receive the wire 2. Thus, it will be seen, Figs. 5 and 27, that as the shaft 45 revolves in the direction indicated by the arrows, the supporting latch member 81 will be reciprocated backwards and forwards in such a manner that when the said member 81 is in the extreme left position, the held wire 2 will be released and allowed to fall. With particular reference to Fig. 27, it will be noticed that as the shaft 45 revolves the end 147 of the supporting member 145 will ride the periphery of the cam 148, thus holding the end of the wire in the notch 150. The member 145 is so positioned on the frame 73 that the notch 150 therein is in the same horizontal plane with the head 110 of the knotter shaft 92 when the end 147 of the said member 145 is riding the periphery of the cam 148. But, during the knotting or twisting operation, the end 147 takes into the notch 151 of the cam 148 and allows the notch 150, as well as the extension 149, to drop under the action of gravity from its wire holding position and thus allows said wire to be held in the notch or groove 158 of the knotter head 110, as will be more fully disclosed below.

The operation of the mechanism, so far disclosed, may be summarized as follows:— The wire 2 having been cut by the cutting member 29, drops onto the inclines 76 of the frame members 68 and 73. In sliding down these inclines, the extremities of the wire 2 contact against the guiding plates 155 and 156, see Figs. 1 and 29, so that one end of each wire will be positioned at a uniform distance from the knotter head 110 and will be headed at a uniform distance from the other end thereof. That is, the wire 2 having been released by the holding hooks 74 and 75, now drops upon the supporting arms 81 and 145, placing it in the position shown at 80, see Figs. 1, 16, 27, 13, 20 and 29. In this position, it will be seen that the extreme end portion 157 of the wire will be positioned in the transverse groove or slot 158 of the knotter head 110, see especially Figs. 12, 13 and 30. This knotter head in addition to this transverse groove 158, is provided with the longitudinal and parallel side grooves 159 and 160 on either side of the upstanding portion 161. These grooves 159 and 160 are of sufficient size to take the wire when the knotter head 110 is withdrawn into the machine. That is to say, these said grooves 159 and 160 are of a width equal to the diameter of the wire 2. It will be noted, see Figs. 16 and 30, that the member 161 of the knotter head is not strictly rectangular but is slightly hook shaped in transverse section, the top portion bending over toward the right, as seen in Fig. 16, for a purpose which will be disclosed below.

As pin 108 in its circular movement, see Figs. 12 and 13, contacts with the plate 104 and moves the same toward the right, as seen in said figures, the head 110 of the knotter mechanism will be drawn into the machine carrying therewith a portion of the end 157 of the wire. In so doing, however, the wire will be bent and provided with a transverse U-shaped bend 170 as clearly indicated in Fig. 14. When the pin 108 has advanced the knotting mechanism to its fullest extent toward the right, as seen in Figs. 12 and 13, or in other words when the pinion 91 has been drawn into mesh with the teeth 130 of the segmental gear 90, rotation of the knotter shaft 92 and its associated parts will commence. From Figs. 14, 20, 22, 23, and 24, it will be seen that as the pinion 91 is revolved by the gear 90, the main body portion 162 of the wire 2 will be wrapped around the transversely extending end portion 157 of the said wire, and after the full one and one quarter turns of the said pinion 91 have taken place, there will have been formed the looped knotted end 165, see Fig. 21, on the wire 2.

The segmental gear 90 having now revolved the pinion 91 to form this twisted loop, the pin 108 takes against the plate 105 in its continued revolution, thereby pushing the knotter shaft 92 and its associated parts toward the left as seen in Figs. 12, 13, 20 and 22. During the outward movement of these parts, shaft 45 has turned the cam 148, Fig. 27, to that position which allows the end 147 of lever 145 to engage the notch 151 of said cam, thereby allowing the holding lever 145 to turn about pivot 146 as a center and thereby lower the angular extension 149 of said lever to the position shown in Figs. 22 and 25. In other words, the portion 149 has been lowered out of the position 80 of the wire 2, while the looped knotted end 165 is being fed out of the machine, so that the headed wire may be released from the knotter or twister head 110 and allowed to drop therefrom.

It will be noted particularly from Figs. 19 and 25, that at the completion of the twisting or heading operation and while the knotter shaft 92 and its associated parts are moving to the left, as seen in said figures, the main body portion 162 of the wire is moved outwardly from the position it occupies in Fig. 20 to that shown in Fig. 19, thus being cleared from the holding lever 145.

When the pinion 91 has been rotated its full one and one quarter turns, as heretofore described, the wire 2 will be in the position as shown in Figs. 22 and 23. Upon the turning back of the pinion 91 by reason of the plate 95 riding the incline 115 of the plate 111, the wire 2 will be put under a strain and bowed into the shape shown in Figs. 24 and 29, imparting a tendency therein to spring from such position. Upon the further backward turning of the knotter shaft 92 and its associated parts, see Figs. 24, 25 and 26, in the direction of the arrows, the loop 165 will slip off the hook shaped upstanding portion 161 of the knotter head and spring from the position maintained during the twisting operation, thus allowing the now completely headed wire to fall to the weighing mechanism with which this machine is provided, and which will now be described.

The weighing mechanism with which this machine is provided is shown in Figs. 1, 2, 3 and 6, and comprises the supporting rod 170 disposed below the horizontally disposed table member 42. This said rod 170 is provided with suitable V-shaped apertures 171 adapted to receive the points 172 of the supporting screws 173 located in the depending brackets 174 from said table member 42. Secured to the rod 170 are the horizontally disposed levers 175 provided at their rearward portions with the weights 176 adapted to be slid alongside lever 175 and secured in adjusted position, as by the screws 177, see Fig. 3. The forward ends of the levers 175 are provided with the yokes 178 pivoted, as at 179, to said levers. The plate 42 is provided with depending fingers 180 to which is secured one end of a spring 181, the other end of which is secured to the yoke 178, as at 182. The yoke 178 is enlarged as at 185 on one side of the pivots 179, and one of the prongs of the yoke 178 extends upwardly as shown in Fig. 6, at 186, to take against the flange 187 of the plate 42. This weighing mechanism is of the usual well known type in machines of this character and should be readily understood from the foregoing description. A brief description of its operation, however, is as follows:—

The wires 2, after having been provided with the looped head or tie 165, as heretofore described, upon leaving the knotter head 110, will fall under the action of gravity into the weighing yokes 178. Here, they will collect until a sufficient quantity thereof will overcome the weight of the adjustable sliding weight 176 located on the rearwardly extending portions of the balancing levers 175, whereupon the load of wires 2 carried by the yokes will cause the levers 175 to tilt about the points 172 as a center. The pivot 179 of the yokes 178 are so positioned that upon the tilting of these weighing levers 175, the weight of the wires 2 in said yokes will overcome the weight of the enlarged portion 185 of the yokes, causing the yokes to turn about the pivots 179 as a center, and allow the accumulated wires 2 to be spilled from the yokes 178 into any suitable collecting means such as the hooks 190, see Fig. 1, disposed below the weighing mechanism and supported by the lower plate member 41.

As soon as the wires 2 have been delivered from the yokes 178, the weights 176 on the rearwardly extending portion of the balancing levers 175, will cause the said yokes to return to the position shown in Figs. 3 and 6. They will then be ready to receive the subsequent wires dropped from the knotting mechanism. Inasmuch as the wires are of uniform cross section and length, this weighing mechanism will serve the purpose of counting the wires, but of course it is evident that the number of wires to be collected in the yokes 178 may be varied by the adjustment of the weights 176 along the rearwardly extending portions of the balancing levers 175.

It will now be clear that, after the cut lengths of wire 2 are automatically fed down between the guide members 155 and 156, Figs. 1 and 29, and into the position 80, one end portion 157 of the same drops into the groove or depression 158 in the knotter head 110, Fig. 30, which reciprocates in the orifice 195 of the thimble or tube 196, Figs. 12, 16 and 29, and carries said end portion 157 with it. But the end portion 157 of the wire being disposed in a direction transverse to the orifice 195, where the groove 158 carrying the wire enters the said orifice it bends the wire into the loop 170, best shown in Figs. 14 and 30, and forces the parallel disposed members of said wire to occupy the grooves 159 and 160 of the said head 110. The rotation of said head while inside said orifice 195, as indicated in Figs. 23, 24 and 26, naturally winds the bent looped portion of the wire around the straight unbent portion thereof, as indicated, and the movement of said head 110 out of said orifice 195, naturally permits the spring action of the wire indicated in Figs. 24 and 29 to come into play to release the knotted end of the wire from the head 110. The release of the knotted wire permits the latter to fall into the weighing mechanism shown in Figs. 3 and 6.

What is claimed is:—

1. In a bale tie making machine, the combination of a knotter shaft provided with means comprising a pair of parallel disposed grooves and a slot associated therewith and adapted to engage a wire; means provided with an orifice into and out of which said wire engaging means may move; means to move said wire engaging means into and out of said orifice; and means to rotate said wire engaging means.

2. In a bale tie making machine, the combination of a knotter shaft provided with means comprising a pair of parallel disposed grooves and a slot associated therewith and adapted to engage a wire; means to feed a wire to said wire engaging means; means provided with an orifice into and out of which said wire engaging means may move, with a portion of the fed wire; means to move said wire engaging means and a portion of said wire into and out of said orifice; and means to rotate said wire engaging means.

3. In a bale tie making machine, the combination of a knotter member provided with means comprising a pair of parallel disposed grooves and a slot associated therewith and adapted to engage a wire; means provided with an orifice into which said wire engaging means may move; means for feeding a wire to said wire engaging means; means to move said last named means with a portion of the wire engaged therewith into and out of said orifice; and means to rotate said wire engaging means after the latter has been moved into said orifice.

4. In a bale tie making machine, the combination of means to straighten a wire; means to cut the straightened wire into a predetermined length; a knotter shaft provided with means comprising a pair of parallel disposed grooves and a slot associated therewith and adapted to engage a wire; means provided with an orifice into and out of which said wire engaging means may move; means to move said wire engaging means into and out of said orifice;

and means to rotate said wire engaging means.

5. In a bale tie making machine, the combination of means to straighten a wire; means to cut the straightened wire in a predetermined length; a knotter member provided with means comprising a pair of parallel disposed grooves and a slot associated therewith and adapted to engage a wire; means provided with an orifice into which said wire engaging means may move; means for feeding a wire to said wire engaging means; means to move said last named means with a portion of the wire engaged therewith into and out of said orifice; and means to rotate said wire engaging means after the latter has been moved into said orifice.

6. In a bale tie making machine, the combination of means to straighten a wire; means to cut the straightened wire into predetermined lengths; a knotting means provided with a wire engaging head provided with a pair of parallel disposed grooves and a slot; means provided with an orifice into and out of which said head may move; means to feed a straightened and cut wire into engagement with said head; means to move said head into and out of said orifice after said wire is engaged therewith; and means to rotate said head after it is moved into said orifice.

7. In a bale tie making machine, the combination of means to straighten a wire; means to cut the straightened wire into predetermined lengths; a knotting means provided with a wire engaging head provided with a pair of parallel disposed grooves and a slot; means provided with an orifice into and out of which said head may move; automatic means to feed a straightened and cut wire into engagement with said head; automatic means to move said head into and out of said orifice after said wire is engaged therewith; and intermittently acting means to rotate said head after it is moved into said orifice.

8. In a bale tie making machine, the combination of a knotter shaft provided with a pair of parallel disposed grooves and a slot associated therewith to form a knotter head; means provided with an orifice into and out of which said head may move; and means comprising a rotating shaft adapted to move said head into and out of said orifice.

9. In a bale tie making machine, the combination of a knotter shaft provided with a pair of parallel disposed grooves and a slot associated therewith to form a knotter head; means provided with an orifice into and out of which said head may move; means comprising a rotating shaft adapted to move said head into and out of said orifice; and connections with said shaft by which said head is rotated while in said orifice.

10. In a bale tie making machine, the combination of a knotter shaft provided with a grooved and slotted knotter head; means provided with an orifice into and out of which said head may move; means comprising a rotating shaft adapted to move said head into and out of said orifice; means for rotating said head in one direction through a predetermined arc; and means for rotating said head in an opposite direction through a lesser arc.

11. In a bale tie making machine, the combination of means comprising a member having an aperture and a shaft reciprocating through said aperture provided with a pair of longitudinally disposed grooves and a transverse slot associated with said grooves the whole adapted to tie a knot in a tie wire; and means to automatically feed said wire to the knot tying means.

12. In a bale tie making machine, the combination of means comprising a member having an aperture and a shaft reciprocating through said aperture provided with a pair of longitudinally disposed grooves and a transverse slot associated with said grooves the whole adapted to tie a knot in a tie wire nearer one end than the other of the same; and means to automatically and intermittently feed said wire to the knot tying means.

13. In a bale tie making machine, the combination of means to straighten a wire; means to cut the straightened wire into a predetermined length; means comprising a member having an aperture and a shaft reciprocating through said aperture provided with a pair of longitudinally disposed grooves and a transverse slot associated with said grooves the whole adapted to tie a knot in an end portion of said cut and straightened wire; and means to feed said wire to said knot tying means.

14. In a bale tie making machine, the combination of means to straighten a wire; means to cut the straightened wire into a predetermined length; reciprocating and rotating means including a pair of parallel disposed grooves and a slot associated therewith forming a knotter head adapted to tie a knot in an end portion of said cut and straightened wire; and means to intermittently feed said wire to said knot tying means.

15. In a bale tie making machine, the combination of automatic means to straighten a wire from a coil of the same; means to cut the straightened wire into predetermined lengths; means comprising a member having an aperture and a shaft provided with a pair of longitudinally disposed grooves and a transverse slot associated with said grooves, said slot and grooves adapted to reciprocate through said aperture and to tie a knot in said straightened and cut wire;

and means to segregate the knotted wires.

16. In a bale tie making machine, the combination of automatic means to straighten a wire from a coil of the same; means to cut the straightened wire into predetermined lengths as fast as said wire is straightened; means to feed said straightened and cut wire to a knotting mechanism as fast as it is cut; means comprising a member having an aperture and a shaft provided with a pair of longitudinally disposed grooves and a transverse slot associated with said grooves said slot and grooves adapted to reciprocate through said aperture and to tie a knot in said straightened and cut wire; and means to segregate the knotted wires.

17. In a bale tie making machine, the combination of automatic means to straighten a wire from a coil of the same; means to cut the straightened wire into predetermined lengths; rotating means comprising a pair of parallel disposed grooves and a slot associated therewith forming a knotted head adapted to tie a knot in said straightened and cut wire as fast as said wire is straightened and cut; and means to segregate the knotted wires.

18. In a bale tie making machine, the combination of automatic means for straightening and cutting a wire in predetermined lengths; and means comprising a pair of parallel disposed grooves and a slot associated therewith forming a knotter head adapted to tie a knot in one end of said wire having a loop in a plane transverse to the body of said wire.

19. In a bale tie making machine, the combination of automatic means for straightening and cutting a wire in predetermined lengths, means comprising a pair of parallel disposed grooves and a slot associated therewith forming a knotter head adapted to tie a knot in one end of and transverse to the body of said wire; and automatic means to feed said wire to said knot tying means.

20. In a bale tie making machine, the combination of automatic means for straightening and cutting a wire in predetermined lengths; reciprocating and rotating means comprising a pair of parallel disposed grooves and a slot associated therewith forming a knotter head adapted to tie a knot in one end of said wire having a loop disposed in a plane transverse to the body of said wire; and means to feed the straightened and cut wire to said knot tying means.

21. In a bale tie making machine the combination of means to straighten and cut wire into predetermined lengths; means to tie a knot in one end of the cut wire comprising a rotating shaft, as well as a slidable reciprocating cam actuated from said shaft, and a second shaft movable with said cam; and connections between said first and second named means adapted to operate said second named means in time with said first named means.

22. In a bale tie making machine the combination of means to straighten and cut wire into predetermined lengths; means to tie a knot in one end of the cut wire comprising a rotating shaft, as well as a slidable reciprocating cam actuated from said shaft, and a second shaft movable with said cam; connections between said first and second named means adapted to operate said second named means in time with said first named means; and means for feeding the cut wire to said second shaft.

23. In a bale tie making machine the combination of means to straighten and cut wire into predetermined lengths; means to tie a knot in one end of the cut wire comprising a rotating shaft, as well as a slidable reciprocating cam actuated from said shaft, and a second shaft movable with said cam; connections between said first and second named means adapted to operate said second named means in time with said first named means; and means controlled by said second named means for feeding the cut wire to said second shaft.

In testimony whereof I affix my signature.

PARVIN WRIGHT.